(12) United States Patent
Condon

(10) Patent No.: US 11,768,921 B2
(45) Date of Patent: Sep. 26, 2023

(54) MONITORING LICENSE CONSTRAINTS IN A CONTAINER ORCHESTRATION SYSTEM

(71) Applicant: Hewlett Packard Enterprise Development LP, Houston, TX (US)

(72) Inventor: Miguel Murillo Condon, Las Rozas Madrid (ES)

(73) Assignee: Hewlett Packard Enterprise Development LP, Spring, TX (US)

( * ) Notice: Subject to any disclaimer, the term of this patent is extended or adjusted under 35 U.S.C. 154(b) by 535 days.

(21) Appl. No.: 17/019,633

(22) Filed: Sep. 14, 2020

(65) Prior Publication Data

US 2022/0083629 A1 Mar. 17, 2022

(51) Int. Cl.
*G06F 16/27* (2019.01)
*G06F 21/10* (2013.01)
*G06F 9/54* (2006.01)

(52) U.S. Cl.
CPC ............ *G06F 21/105* (2013.01); *G06F 9/547* (2013.01); *G06F 16/27* (2019.01); *G06F 2221/0706* (2013.01)

(58) Field of Classification Search
CPC ........ G06F 21/105; G06F 16/27; G06F 9/547; G06F 2221/0706
USPC .......................................................... 726/2
See application file for complete search history.

(56) References Cited

U.S. PATENT DOCUMENTS

| | | | |
|---|---|---|---|
| 10,191,778 B1 * | 1/2019 | Yang | G06F 11/301 |
| 10,552,586 B1 * | 2/2020 | Duan | G06F 9/455 |
| 10,649,630 B1 * | 5/2020 | Vora | G06F 21/105 |
| 10,817,346 B1 * | 10/2020 | Culp | G06F 9/5072 |
| 11,068,136 B1 * | 7/2021 | Koushik | G06F 3/0482 |
| 11,611,436 B2 * | 3/2023 | Ziegler | H04L 67/02 |
| 2009/0249488 A1 * | 10/2009 | Robinson | G06F 21/10 726/26 |
| 2014/0137259 A1 * | 5/2014 | Chen | G06F 21/105 726/26 |
| 2021/0026932 A1 * | 1/2021 | Boudreau | G06F 16/25 |
| 2021/0073354 A1 * | 3/2021 | Tyagi | G06F 11/3409 |

(Continued)

OTHER PUBLICATIONS

Citrix, "Licensing—Citrix ingress controller for Kubernetes", 2 pages, retrieved on May 14, 2020 from https://developer-docs.citrix.com/projects/citrix-k8s-ingress-controller/en/latest/licensing/.

(Continued)

*Primary Examiner* — Thanh T Le
(74) *Attorney, Agent, or Firm* — Slater Matsil, LLP

(57) ABSTRACT

Embodiments described herein are generally directed to a cloud-native approach to software license enforcement in a container orchestration system. According to an example, information indicative of a number of sets of containers that are making use of one or more components of an application is received. The application is licensed by the tenant and the sets of containers are running within a namespace of the tenant within a cluster of a container orchestration system. Overuse of the application by the tenant is determined based on whether the number exceeds a licensing constraint for the application specified within an Application Programming Interface (API) object of the container orchestration system corresponding to the application. Responsive to a determination that the application is being overused by the tenant, the tenant is caused to be notified regarding the overuse.

17 Claims, 6 Drawing Sheets

(56) References Cited

U.S. PATENT DOCUMENTS

| | | | | |
|---|---|---|---|---|
| 2021/0141636 | A1* | 5/2021 | Babol | G06F 8/71 |
| 2021/0192017 | A1* | 6/2021 | Aigner | G06F 21/554 |
| 2021/0240540 | A1* | 8/2021 | Wang | G06F 9/45558 |
| 2021/0382727 | A1* | 12/2021 | Vigil | G06F 9/5022 |
| 2021/0397712 | A1* | 12/2021 | Gajananan | G06F 21/51 |
| 2022/0012045 | A1* | 1/2022 | Rudraraju | G06Q 30/02 |
| 2022/0058012 | A1* | 2/2022 | Kaushik | H04L 63/029 |

OTHER PUBLICATIONS

Elasticsearch, "Managing licenses in ECK", 3 pages, retrieved from https://www.elastic.co/guide/en/cloud-on-k8s/master/k8s-licensing.html.

Joffry Ferrater, "Cloud Native Authorization Engine on Kubernetes Cluster", Jan. 8, 2019, 7 pages, retrieved from https://www.axiomatics.com/blog/cloud-native-authorization-engine-on-kubernetes-cluster-part-1/.

Portworx, "License operations using pxctl", Apr. 3, 2020, 1 page, retrieved from https://docs.portworx.com/reference/cli/license/.

VMware, "Network-Attached Full or Partial GPUs to Any Kubernetes Cluster Using Bitfusion FlexDirect", 2019, 10 pages.

\* cited by examiner

License 225

```
Kind: ConfigMap
metadata:
   creationTimestamp: 2020-08-18T18:52:05Z
   name: xyz_license
   namespace: tenant_1
   clusterip: 20.20.20.10:5000, 20.20.20.11:5000, 20.20.20.12:5000
   licensesignature: 4588728309aj1w22z52292772w0j2j22w24r4i
data:
   xyz.properties: |
      clusterip: 20.20.20.10:5000, 20.20.20.11:5000, 20.20.20.12:5000
      licensesignature: 4588728309aj1w22z52292772w0j2j22w24r4i
      max_number_processes_licenses=2   # counter
      premium_1=enabled
      premium_2=disabled
```

*FIG. 2*

MONITORING LICENSE CONSTRAINTS IN A CONTAINER ORCHESTRATION SYSTEM

BACKGROUND

Software is commercialized in a number of different ways, including paid-up, perpetual licenses and subscription-based licenses. Software vendors may offer customers a free or trial version with enhanced features available for a fee. Software license enforcement refers to the mechanisms that are used to manage software license compliance.

BRIEF DESCRIPTION OF THE DRAWINGS

Embodiments described here are illustrated by way of example, and not by way of limitation, in the figures of the accompanying drawings in which like reference numerals refer to similar elements.

FIG. 2 illustrates a license in accordance with an example embodiment.

DETAILED DESCRIPTION

Figure 1:
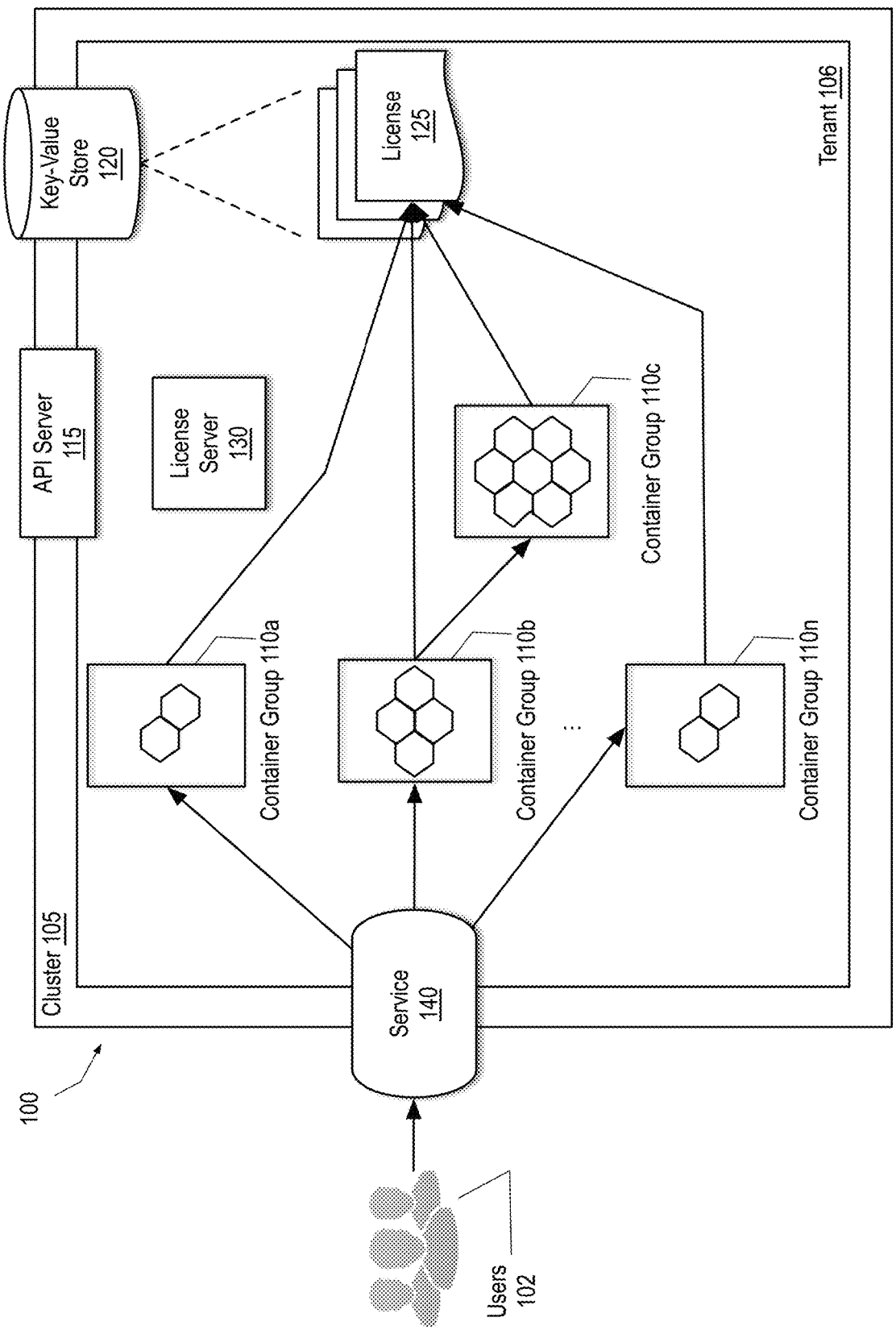
FIG. 1 is a high-level block diagram conceptually illustrating an approach to license enforcement in the context of a container orchestration system in accordance with an example embodiment.

Embodiments described herein are generally directed to a cloud-native approach to software license enforcement in a container orchestration system. In the following description, numerous specific details are set forth in order to provide a thorough understanding of example embodiments. It will be apparent, however, to one skilled in the art that embodiments described herein may be practiced without some of these specific details.

Two basic approaches used for software license enforcement include the use of a license file and the use of a license server. A license file for a commercial software application may be stored on a computer system, e.g., a server system or an endpoint system. The license file may contain information regarding the product, a version number, the maximum version the license supports, an expiration date for the license (if not permanent), a license count (if the license is not a single-seat license), a machine ID (or host ID) to which the license is bound, and a digital signature to prevent tampering with the license. When the commercial software application is launched, it may verify existence of the license file at a predetermined location and various aspects of the license with reference to the host on which the software application has been launched. Software license enforcement based on a license file does not provide the flexibility required for various customer usage scenarios and is subject to misuse.

An on-premises license server or cloud-based license server provides customers with more flexibility by supporting floating licensing in which a limited number of licenses for a commercial software application may be shared among a larger number of users over time. For example, when an authorized user launches the software application, the application obtains a license, for example, in the form of a token, from a central license server. When the user is finished using the application, the license is returned to the license server and is again available for use by other authorized users. This license token approach does not match well with the nature of container orchestration systems (e.g., Kubernetes, Docker Swarm, Amazon Elastic Kubernetes Service (EKS), Google Kubernetes Engine (GKE), Microsoft's Azure Kubernetes Service (AKS), and Apache Mesos) and container or pod lifecycles. For example, the constant creation and destruction of containers or pods may exhaust the number of tokens or introduce issues relating to counting of the number of available or used tokens. Furthermore, a license server typically has a fixed Internet Protocol (IP) address, which does not reflect the reality of the use of cluster IP addresses (e.g., the ClusterIP of a Kubernetes service) assigned by a container orchestration system to represent a service provided by a cluster operating within the container orchestration system.

Embodiments described herein seek to provide a cloud-native approach to control usage of applications running within a container orchestration system. As described in further detail below, in various embodiments, as pods (which may be referred to herein as "service pods") running one or more components of an application are created within a tenant (or a namespace of a tenant), for example, to support providing a service to a new user or responsive to autoscaling to support increasing workload by an existing user, the service pods may mount a license as a volume or a file to, among other things, facilitate monitoring of licensing constraints by a license server pod running within the namespace. For example, the license server pod may periodically evaluate whether the application is being overused by requesting information from an Application Programming Interface (API) server of the container orchestration to identify the number of service pods that have the license file mounted and comparing the number to a maximum threshold authorized by the license.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, an "Application Programming Interface object" or an "API object" generally refers to an object that can be created, read, updated, and/or modified via an API. A non-limiting example of an API object is a Kubernetes ConfigMap.

As used herein, a "set of containers" may include one or more containers. Non-limiting examples of a set of containers include a Kubernetes Pod and a Docker Pod.

As used herein, a "service pod" generally refers to a set of containers (or a pod) that run one or more components of an application. The application may be exposed as a service onto an external Internet Protocol (IP) address.

FIG. 1 is a high-level block diagram conceptually illustrating an approach to license enforcement in the context of a container orchestration system 100 in accordance with an example embodiment. In this example, the container orchestration system 100 includes a cluster 105, an Application Programming Interface (API) server 115, and a key-value store 120. Container orchestration systems may include other system-level or master components, for example, a scheduler and a controller manager, which are outside of the scope of this disclosure and unnecessary for understanding the various embodiments described herein.

Continuing with the present example, the API server 115 exposes a Hypertext Transfer Protocol (HTTP) API, for example, to service Representational State Transfer (REST) operations. The API server 115 facilitates communication among various parts of the cluster 105 and/or external components, provides a front end to shared state of the cluster 105 and may be responsible for storing API objects into a persistent storage backend (e.g. key-value store 120).

In the context of the present example, key-value store 120 may represent a consistent and highly-available backing store for cluster data. In a Kubernetes cluster, the key-value store 120 may be etcd.

The cluster 105 (e.g., a Kubernetes cluster) may represent a highly-available cluster of multiple nodes (not shown). The nodes may be virtual machines or physical computer systems among which sets of containers or pods (e.g., container groups 110a-n) are distributed. Non-limiting examples of physical computer systems are described below with reference to FIGS. 5 and 6. While in the present example the cluster 105 is shown including a single tenant (e.g., tenant 106), the cluster 105 may support multiple tenants using one or more tenant isolation features (e.g., separate namespaces) of the container orchestration system 100. As such, depending upon the context, the term "tenant" may be used herein to refer to a tenant (e.g., a user or a group of users), a namespace (e.g., a mechanism to divide cluster resources among multiple users), or a tenant namespace (the namespace of a particular tenant). As those skilled in the art understand, different container orchestration systems may use different terminology to refer to a namespace. For example, in the context of Red Hat OpenShift what is referred to herein as a namespace is referred to as a project and in the context of OpenStack what is referred to herein as a namespace is referred to as a tenant.

Tenant 106 is shown running container groups 110a-n and license server 130. The container groups 110a-n may each include one or more containers and may be distributed across multiple nodes of the cluster 105. Each of the container groups 110a-n may execute one or more components of an application that may be exposed to users 102 in the form of a service 140. In a Kubernetes cluster, each of the container groups 110a-n represent a Pod.

In various examples described herein, both the container groups 110a-n and the license server 130 may play a role in software license enforcement. As described further below with reference to FIG. 3, for their part, responsive to being launched, the container groups 110a-n may, among other things, mount an API object (e.g., license 125) corresponding to the application at issue as a volume or a file. The license 125 may be stored within the key-value store 120 and mounted by way of a REST operation issued to the API server 115. Depending upon the particular implementation, the license 125 may limit the concurrent instances of a particular type of component of the licensed application. As described further below with reference to FIG. 2, in a Kubernetes cluster, the license 125 may be represented as a ConfigMap and the number of pods that have the ConfigMap mounted may be used as a representation of license usage.

In an example, license server 130 represents a container group (e.g., a pod) that is responsible for monitoring the compliance of the container groups 110a-n with one or more license constraints (e.g., the number of processes or container groups that are authorized to be active concurrently) specified by the license 125. As such, the license server 130 may be referred to herein as a license server pod. According to one embodiment, the license server 130 periodically (e.g., responsive to a timer or an event, such as start-up of a container group) evaluates whether usage of the service 140 is within limits established by the license 125, for example, by comparing the number of container groups 110a-n that currently have the license 125 mounted to a maximum threshold defined within the license 125. An example of processing performed by the license server 130 is described further below with reference to FIG. 4.

In various examples described herein, license server 130 runs independently of the container groups 110a-n and the container groups 110a-n are essentially unaware of the existence of the license server 130. In alternative embodiments, the container groups 110a-n may interact with the license server 130 during their respective start-up processing, for example, registering with or otherwise notifying the license server 130 regarding their existence. Furthermore, while in the context of the present example, the license server 130 is described as a centralized entity or component separate from the container groups 110a-n, it is to be understood in alternative implementations the functionality of the license server 130 may be distributed among the container groups 110a-n and performed by the container groups 110a-n, for example, during their respective start-up processing.

Those skilled in the art will appreciate there are numerous container orchestration systems, for example, Kubernetes, Docker Swarm, Amazon EKS, GKE, AKS, and Apache Mesos, and that various architectural differences exist among them. While, for sake of brevity, certain examples provided herein may be described with respect to the Kubernetes container orchestration system, the systems and methodologies are equally applicable to other container orchestration systems.

FIG. 2 illustrates a license 225 in accordance with an example embodiment. License 225 is a non-limiting example of license 125 of FIG. 1. As noted above, a traditional (non-cloud-native) license server typically has a fixed IP address, which does not reflect the reality of the lifecycle of container groups or pods (e.g., container groups 110a-n) or the nature of cluster IP addresses (e.g., the ClusterIP of a Kubernetes service), which may be dynamically assigned by a container orchestration system (e.g., container orchestration system 100) to represent a service (e.g., service 140) provided by a cluster (e.g., cluster 105) operating within the container orchestration system. As such, in various embodiments described herein, the license 225 uses that which is fixed in the cloud environment, for example, Kubernetes cluster master IPs, the tenant licensed to use the application, and the name of the license name (e.g., the name of the ConfigMap) containing the license information and constraints.

In the context of the present example, license 225 is an API object (e.g., a ConfigMap) that stores metadata and data in key-value pairs, including, among other metadata and data, a name, a namespace, one or more ClusterIPs, and a counter specifying the maximum number of processes that are authorized to be concurrently running one or more components of the application to which the license 225 corresponds. To the extent one or more types of components are desired to be tracked/monitored separately, a separate license specifying a maximum threshold for the respective type of component may be used for each monitored type of application component. For example, collectively, the licenses may authorize X instances of a first type of component of the application and Y instances of a second type of component of the application.

According to one embodiment, core features of the licensed application may be included within the license 225 by default and premium or enhanced features (e.g., premium_1 and premium_2) may be included for an additional subscription fee. For example, all business logic may be provided to a tenant for a base fee or no fee, but interfaces, such as Diameter, Radius, HTTP, and Kafka, may require authorization and the customer pays an additional fee to include support for these premium features.

The various servers (e.g., API server 115 and license server 130) and container groups (e.g., container groups 110*a-n*) described herein and the processing described below with reference to the flow diagrams of FIGS. 3-4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer systems described with reference to FIGS. 5-6 below.

Figure 3:
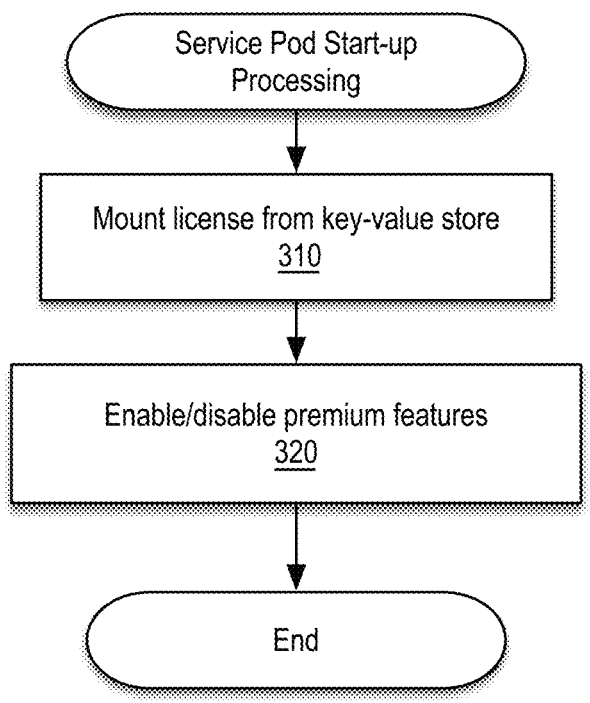
FIG. 3 is a flow diagram illustrating service pod start-up processing in accordance with an example embodiment.

FIG. 3 is a flow diagram illustrating service pod start-up processing in accordance with an example embodiment. In the context of the present example, both service pods (e.g., container groups 110*a-n*) and a license server (e.g., license server 130) play a role in software license enforcement. Those skilled in the art will appreciate not all processing that may be performed by a service pod is described herein. Rather, for sake of brevity, this example focuses on initialization, configuration and/or start-up processing that may be performed by a service pod to facilitate software license enforcement and/or auditing. License constraints associated with the use of a commercial software application running within a container orchestration system (e.g., container orchestration system 100) may be enforced, for example, to avoid adverse effects on customer service. Auditing of use of the commercial software application may indicate a potential need for an update to the license (e.g., the purchase of more licenses), for example, if over usage is observed at a frequency exceeding a predefined or configurable threshold.

Prior to block 310, it is assumed a new service pod has been launched on a node of a cluster (e.g., cluster 105). The new service pod may have been launched as a result of a new user (e.g., one of users 102) making use of a service (e.g., service 140) or as a result of autoscaling to support increasing demands placed on the service by an existing user (e.g., one of users 102).

At block 310, a license is mounted from a key-value store. For example, the license (e.g., license 125 or 225) may be mounted by a container of the service pod at issue as a volume or as a file. In one embodiment, the license represents an API object (e.g., a ConfigMap) and the key-value store (e.g., key-value store 120) represents a consistent and highly-available backing store (e.g., etcd) for cluster data. According to one embodiment, the cluster's state information includes information regarding the name of a pod by which the license is currently mounted. As described further below with reference to FIG. 5, in this manner, a license server pod may obtain information regarding a number of service pods that are making use of one or more components of the application.

At block 320, premium features may be enabled and/or disabled. According to one embodiment, the service pod reads the license mounted at block 310 and identifies those premium features of the application for which the tenant is authorized to use. Each premium feature to which the tenant is authorized may then be enabled by the service pod.

As those skilled in the art will appreciate initialization of pods may be implemented differently depending upon the particular container orchestration system. For example, in the context of Kubernetes, the configuration file for a pod may create a pod having an application container and an Init container in which the Init container runs to completion before the application container starts. As such, in one embodiment, blocks 310 and 320 described above may be performed by an Init container of the service pod.

Figure 4:
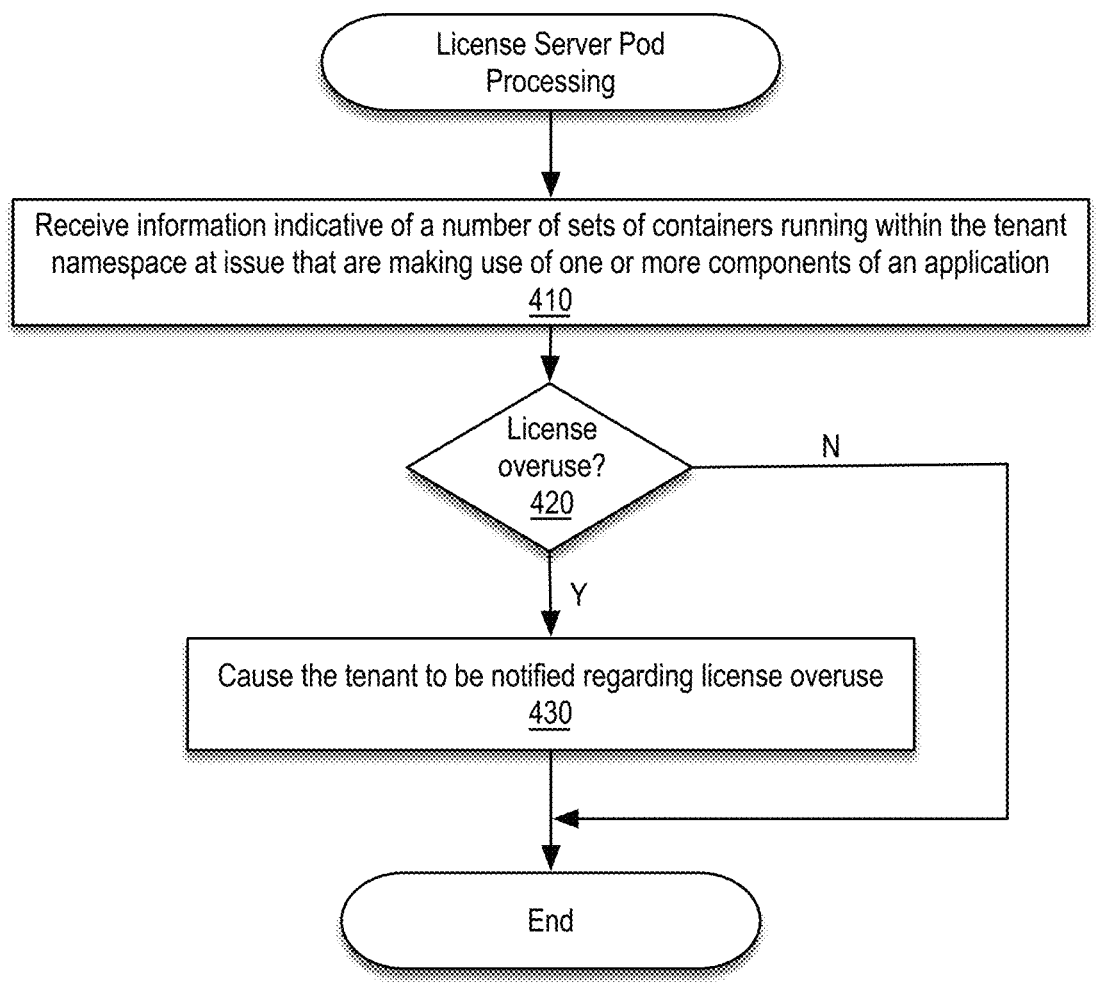
FIG. 4 is a flow diagram illustrating license server pod processing in accordance with an example embodiment.

FIG. 4 is a flow diagram illustrating license server pod processing in accordance with an example embodiment. In one embodiment, the license server pod (e.g., license server 130) is a pod dedicated to monitoring compliance by the service pods (e.g., container groups 110*a-n*) with license constraints specified in the license (e.g., license 125 or 225). Depending upon the particular implementation, there may be a one-to-one relationship between license server pods and licenses or the license server pod may monitor the use of more than one licensed application. In general, the license server pod periodically (e.g., responsive to a timer, an event, or the like) compares the number of service pods making use of the licensed application to the number authorized by the license.

At block 410, information indicative of a number of sets of containers running within the tenant namespace at issue that are making use of one or more components of an application licensed by the tenant is received. In one embodiment, the license server pod may make use of the API server (e.g., API server 115) to determine the number of sets of containers (e.g., container group 110*a-n*) that currently have the license (e.g., license 125 or 225) mounted. Those skilled in the art will appreciate obtaining information regarding the number of service pods having the license (e.g., ConfigMap) mounted may use API programming or a command line interface (CLI) associated with the container orchestration system (e.g., container orchestration system 100). For example, the API and/or the CLI may provide a first operation (e.g., kubectl get configmap–n<namespace to list the ConfigMap for a particular namespace, a second operation (e.g., kubectl get pod–n<namespace>) to list pods for a particular namespace, and a third operation to determine whether the ConfigMap is mounted by a particular service pod.

At decision block 420, it is determined whether the license is being overused. When the license is being overused, processing continues with block 430; otherwise, license server pod processing is complete. According to one embodiment, the overuse determination involves comparing the number of sets of containers received at block 410 with a maximum number authorized as specified by the license. When the number of sets of containers making use of one or more application components exceeds the maximum number authorized, then an overuse condition may be deemed to exist. Depending upon the particular implementation additional or alternative licensing constraints, for example, a number of concurrent users, a peak number of transactions, etc. may be monitored. Additional conditions or information that may be monitored include IP master(s) of the cluster, the namespace, whether the license server is operational, and whether expiration of the license is imminent.

At block 430, the license server pod may cause the tenant to be notified regarding the license overuse. According to one embodiment, the license server pod creates a log entry including information regarding the tenant, the time/date, the application at issue, etc. and posts the log entry to a notification log. A separate process may periodically read the notification log to take appropriate action, for example, notification of the tenant regarding the need for additional licenses.

While in the context of the present example, the license server pod allows overuse of the license and lets the service pod that created the overuse condition to run, in alternative embodiments, additional and/or alternative actions may be taken. For example, the last service pod to have been launched may be killed (terminated) or denied access to the application as a whole or the component at issue. In another embodiment, the license server pod may check at the time a service pod is attempting to be launched whether the license would be overused and deny launching that service pod if the license would be overused. For example, checking for would-be overuse and denying a launch may be implemented via an admission controller webhook.

While in the context of the present example, the license server pod is described as pulling the relevant information to make a determination regarding whether the license is being overused. Those skilled in the art will appreciate, in alternative implementations, the relevant information may be pushed to the license server pod.

In addition to the processing described above the service pods and/or the license server pod may validate the infrastructure (e.g., the ClusterIP) and/or the license signature to confirm the license file (e.g., license 125 or 225) has not been manipulated by a third-party application or by a user.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 5:
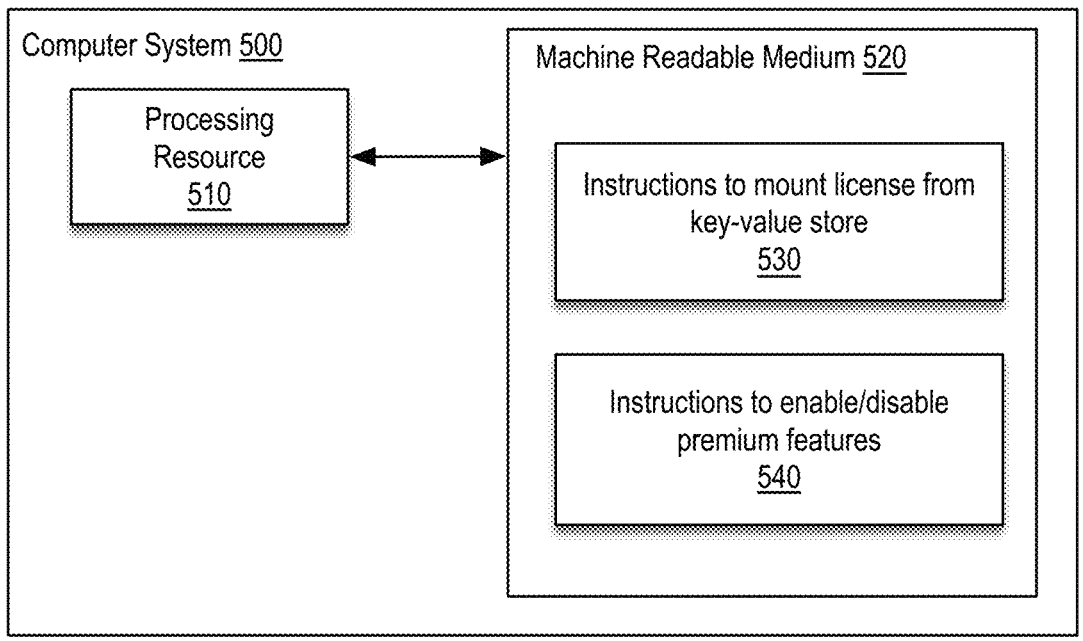
FIG. 5 is a block diagram of a computer system in accordance with an example embodiment.

FIG. 5 is a block diagram of a computer system in accordance with an embodiment. In the example illustrated by FIG. 5, computer system 500 includes a processing resource 510 coupled to a non-transitory, machine readable medium 520 encoded with instructions to perform a private cloud gateway creation processing. The processing resource 510 may include a microcontroller, a microprocessor, central processing unit core(s), an ASIC, an FPGA, and/or other hardware device suitable for retrieval and/or execution of instructions from the machine readable medium 520 to perform the functions related to various examples described herein. Additionally or alternatively, the processing resource 510 may include electronic circuitry for performing the functionality of the instructions described herein.

The machine readable medium 520 may be any medium suitable for storing executable instructions. Non-limiting examples of machine readable medium 520 include RAM, ROM, EEPROM, flash memory, a hard disk drive, an optical disc, or the like. The machine readable medium 520 may be disposed within the computer system 500, as shown in FIG. 5, in which case the executable instructions may be deemed "installed" or "embedded" on the computer system 500. Alternatively, the machine readable medium 520 may be a portable (e.g., external) storage medium, and may be part of an "installation package." The instructions stored on the machine readable medium 520 may be useful for implementing at least part of the methods described herein.

In the context of the present example, the machine readable medium 520 is encoded with a set of executable instructions 530-540. It should be understood that part or all of the executable instructions and/or electronic circuits included within one block may, in alternate implementations, be included in a different block shown in the figures or in a different block not shown.

Instructions 530, upon execution, cause the processing resource 510 to mount a license from a key-value store. In one embodiment, instructions 530 may correspond generally to instructions for performing block 310 of FIG. 3.

Instructions 540, upon execution, cause the processing resource 510 to enable/disable premium features. In one embodiment, instructions 540 may correspond generally to instructions for performing block 320 of FIG. 3.

Figure 6:
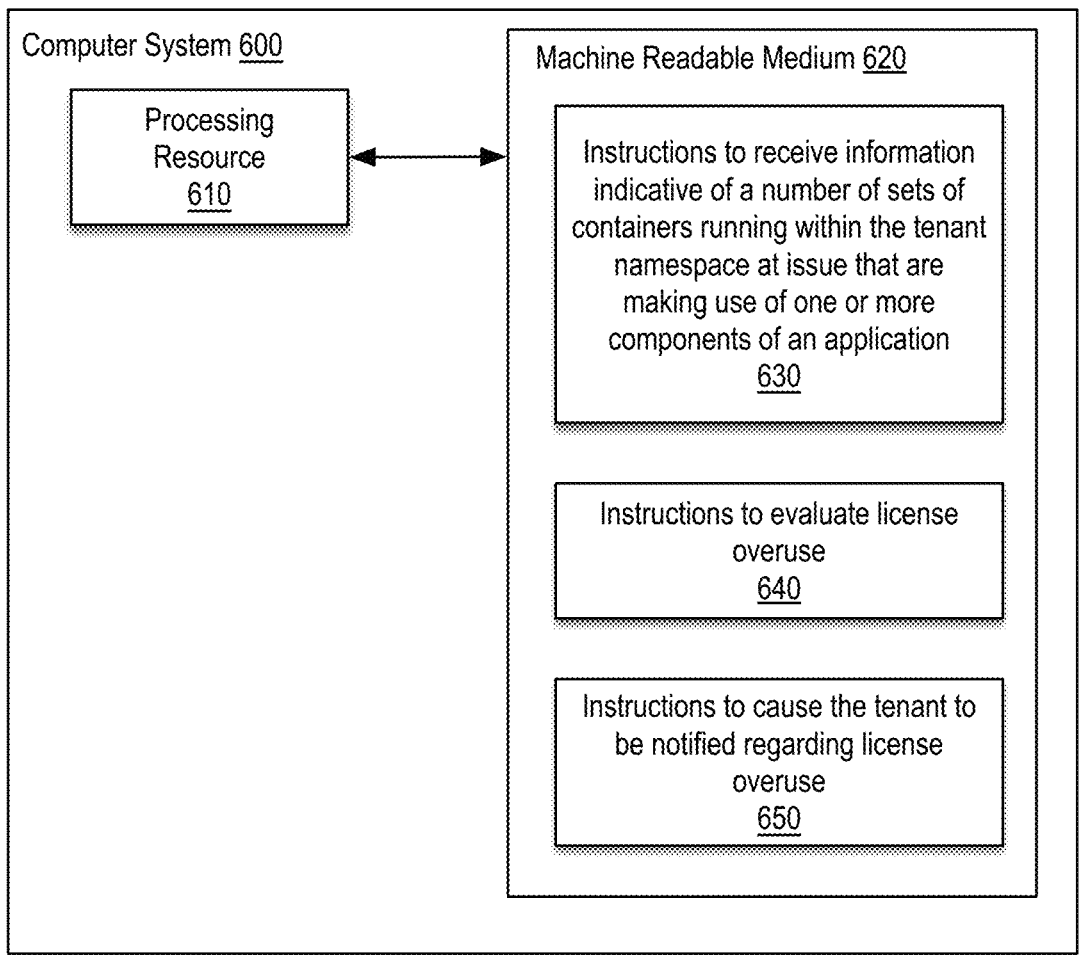
FIG. 6 is a block diagram of a computer system in accordance with another example embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform a private cloud gateway creation processing. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-650. It should be understood that part or all of the executable instructions and/or electronic circuits included within one block may, in alternate implementations, be included in a different block shown in the figures or in a different block not shown.

Instructions 630, upon execution, cause the processing resource 610 to receive information indicative of a number of sets of containers running within the tenant namespace at issue that are making use of one or more components of an application. In one embodiment, instructions 630 may correspond generally to instructions for performing block 410 of FIG. 4.

Instructions 640, upon execution, cause the processing resource 610 to evaluate license overuse. In one embodiment, instructions 640 may correspond generally to instructions for performing decision block 420 of FIG. 4.

Instructions 650, upon execution, cause the processing resource 610 to cause the tenant to be notified regarding license overuse. In one embodiment, instructions 630 may correspond generally to instructions for performing block 430 of FIG. 4.

While computer system 500 and 600 are illustrated and described separately, in one embodiment, they may be one in the same and all instructions described with reference to FIG. 5 and FIG. 6 may be embodied on a common machine readable medium and executed by a common processing resource.

In the foregoing description, numerous details are set forth to provide an understanding of the subject matter disclosed herein. However, implementation may be practiced without some or all of these details. Other implementations may include modifications, combinations, and variations of the details discussed above. It is intended that the following claims cover such modifications, combinations, and variations.

What is claimed is:

1. A system comprising:
a processing resource; and
a non-transitory computer-readable medium, coupled to the processing resource, having stored therein instructions that when executed by the processing resource cause the processing resource to:
receive, from an Application Programming Interface (API) server, information indicative of a number of sets of containers that are making use of one or more components of an application, wherein the application is licensed by a tenant and the sets of containers are running within a namespace of the tenant within a cluster of a container orchestration system, and wherein the information comprises the number of API object mounts of an API object of the container orchestration system corresponding to the application, the API object comprising a license corresponding to the application;
determine overuse of the application by the tenant based on whether the number exceeds a licensing constraint for the application specified within the API object of the container orchestration system corresponding to the application; and
responsive to a determination that the application is being overused by the tenant, cause the tenant to be notified regarding the overuse.

2. The system of claim 1, wherein the container orchestration system comprises Kubernetes and the API object comprises a ConfigMap.

3. The system of claim 2, wherein the ConfigMap specifies the namespace.

4. The system of claim 2, wherein the application is exposed as a service onto an external Internet Protocol (IP) address specified by the ConfigMap.

5. The system of claim 1, wherein the API object is stored in a distributed key-value store of the container orchestration system.

6. The system of claim 1, wherein the licensing constraint comprises a maximum number of pods authorized to make use of the one or more components of the application.

7. The system of claim 1, wherein the instructions further cause the processing resource to, responsive to the determination that the application is being overused by the tenant:
terminate a first set of containers of the sets of containers; or
deny access by the first set of containers to the one or more components of the application.

8. A method comprising:
receiving, by a processing resource running a licensing server pod associated with an application within a namespace of a tenant within a cluster of a container orchestration system, from an Application Programming Interface (API) server, information indicative of a number of service pods that are making use of one or more components of the application, wherein the application is licensed by the tenant and the service pods are running within the namespace, and wherein the information comprises the number of API object mounts of an API object of the container orchestration system corresponding to the application, the API object comprising a license corresponding to the application;
determining, by the processing resource, overuse of the application by the tenant based on whether the number exceeds a licensing constraint for the application specified within the API object of the container orchestration system corresponding to the application; and
responsive to a result of said determining being affirmative, causing, by the processing resource, the tenant to be notified regarding the overuse.

9. The method of claim 8, wherein the API object is stored in a distributed key-value store of the container orchestration system.

10. The method of claim 8, wherein the container orchestration system comprises Kubernetes and the API object comprises a ConfigMap.

11. The method of claim 9, further comprising, when the result of said determining is affirmative, terminating one of the service pods.

12. The method of claim 8, further comprising, when the result of said determining is affirmative, denying access by one of the service pods to the one or more components of the application.

13. A non-transitory machine readable medium storing instructions that when executed by a processing resource of a computer system cause the processing resource to:
   receive, from an Application Programming Interface (API) server, information indicative of a number of sets of containers that are making use of one or more components of an application, wherein the application is licensed by a tenant and the sets of containers are running within a namespace of the tenant within a cluster of a container orchestration system, and wherein the information comprises the number of API object mounts of an API object of the container orchestration system corresponding to the application, the API object comprising a license corresponding to the application;
   determine overuse of the application by the tenant based on whether the number exceeds a licensing constraint for the application specified within the API object of the container orchestration system corresponding to the application; and
   responsive to a determination that the application is being overused by the tenant, causing the tenant to be notified regarding the overuse.

14. The non-transitory machine readable medium of claim 13, wherein the API object is stored in a distributed key-value store of the container orchestration system.

15. The non-transitory machine readable medium of claim 13, wherein the container orchestration system comprises Kubernetes and the API object comprises a ConfigMap.

16. The non-transitory machine readable medium of claim 13, wherein the sets of containers comprise pods, and wherein the licensing constraint comprises a maximum number of pods authorized to make use of the one or more components of the application.

17. The non-transitory machine readable medium of claim 13, wherein the instructions further cause the processing resource to, responsive to the determination that the application is being overused by the tenant:
   terminate a first set of containers of the sets of containers; or
   deny access by the first set of containers to the one or more components of the application.

* * * * *